(12) United States Patent
Kadotani et al.

(10) Patent No.: US 9,213,224 B2
(45) Date of Patent: Dec. 15, 2015

(54) PROJECTOR HAVING COOLING DEVICE THAT SUPPLIES COOLING AIR IN TWO SUPPLY DIRECTIONS

(75) Inventors: Norikazu Kadotani, Matsumoto (JP); Yohei Sakai, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 92 days.

(21) Appl. No.: 13/191,886

(22) Filed: Jul. 27, 2011

(65) Prior Publication Data

US 2012/0033188 A1 Feb. 9, 2012

(30) Foreign Application Priority Data

Aug. 9, 2010 (JP) ................................. 2010-178736

(51) Int. Cl.
| G03B 21/18 | (2006.01) |
| G03B 21/16 | (2006.01) |
| G03B 33/12 | (2006.01) |
| H04N 9/31 | (2006.01) |

(52) U.S. Cl.
CPC ................ *G03B 21/16* (2013.01); *G03B 33/12* (2013.01); *H04N 9/3144* (2013.01)

(58) Field of Classification Search
CPC .......... G03B 21/16; G03B 21/00; H04N 5/74; H05K 7/20
USPC ............................. 353/57, 58, 60, 61; 348/748
See application file for complete search history.

(56) References Cited

U.S. PATENT DOCUMENTS

| 6,334,686 | B1 | 1/2002 | Shiraishi et al. |
| 6,481,854 | B1 * | 11/2002 | Sugawara et al. ............... 353/52 |
| 6,639,743 | B2 | 10/2003 | Watanabe |
| 2004/0227901 | A1 * | 11/2004 | Kobayashi ....................... 353/61 |
| 2007/0019168 | A1 * | 1/2007 | Nakagawa et al. ............. 353/58 |
| 2007/0175469 | A1 * | 8/2007 | Rohrschneider et al. ...................... 128/200.23 |
| 2009/0056920 | A1 | 3/2009 | Lee |
| 2010/0033687 | A1 * | 2/2010 | Utsunomiya ................... 353/58 |
| 2010/0208151 | A1 | 8/2010 | Utsunomiya |
| 2011/0242500 | A1 | 10/2011 | Sakai et al. |

FOREIGN PATENT DOCUMENTS

| JP | 2000-124647 A | 4/2000 |
| JP | 2000-194073 A | 7/2000 |
| JP | 2000-231154 A | 8/2000 |
| JP | 2002-174805 A | 6/2002 |
| JP | 2002-216531 A | 8/2002 |
| JP | 2004-264386 A | 9/2004 |
| JP | 2005-338236 A | 12/2005 |
| JP | 2008-98195 A | 4/2008 |
| JP | 2008-292743 A | 10/2008 |
| JP | 2009-075212 A | 4/2009 |
| JP | 2009-086181 A | 4/2009 |
| JP | 2009092842 A | * 4/2009 |

* cited by examiner

*Primary Examiner* — Sultan Chowdhury
*Assistant Examiner* — Danell L Owens
(74) *Attorney, Agent, or Firm* — ALG Intellectual Property, LLC

(57) ABSTRACT

A projector includes an optical element and a cooling device configured to supply cooling air along the surface of the optical element. The cooling device supplies the cooling air in two supply directions crossing each other and extending from one edge to the other edge of two opposed edges of the optical element.

8 Claims, 4 Drawing Sheets

PROJECTOR HAVING COOLING DEVICE THAT SUPPLIES COOLING AIR IN TWO SUPPLY DIRECTIONS

CROSS-REFERENCE

The entire disclosure of Japanese Patent Application No. 2010-178736 filed Aug. 9, 2010 is expressly incorporated by reference herein.

BACKGROUND

1. Technical Field

The present invention relates to a projector.

2. Related Art

A projector provided with a cooling fan which introduces cooling air from the outside and delivers the cooling air, and a duct connected with the cooling fan to supply the cooling air to an optical element such as a liquid crystal panel is known (for example, see JP-A-2005-338236).

According to the projector disclosed in JP-A-2005-338236, one end of the duct is connected with the cooling fan, and the other end is extended to the vicinity of the position of the liquid crystal panel, so that the cooling air discharged from the cooling fan can be guided to the liquid crystal panel. In this case, the cooling air flows out of the duct through an outlet port provided at the other end of the duct toward the liquid crystal panel in the upward direction from below to cool the liquid crystal panel. More specifically, the cooling air delivered from the cooling fan flows through the inside of the duct in the direction perpendicular to the optical axis of light entering the liquid crystal panel, and collides with the wall surface of the other end of the duct. Then, the cooling air changes its flow direction by this collision, and flows out from the outlet port of the duct.

According to a high-luminance projector developed in recent years, however, the temperature of the optical element such as the liquid crystal panel more easily increases with the rise of the luminance. In this case, the optical element such as the liquid crystal panel is difficult to be effectively cooled by the cooling structure disclosed in JP-A-2005-338236.

SUMMARY

An advantage of some aspects of the invention is to provide a projector capable of effectively cooling an optical element of the projector.

A projector according to an aspect of the invention includes: an optical element; and a cooling device configured to supply cooling air along the surface of the optical element. The cooling device supplies the cooling air in two supply directions crossing each other and extending from one edge to the other edge of two opposed edges of the optical element.

According to this structure, the cooling device supplies cooling air in the two supply directions crossing each other at the time of delivery of cooling air along the surface of the optical element.

In this case, the cooling air supplied in the two supply directions collides with each other and produces turbulence by this collision. Thus, the efficiency of heat exchange between the surface of the optical element and the cooling air increases, which contributes to effective cooling for the optical element.

For example, the following directions are possible supply directions (two supply directions) of the cooling air from the cooling device to the optical element.

That is, the cooling air can be supplied from the one edge of the optical element, and also from another edge crossing the one edge.

When the angle formed by the two supply directions (collision angle) is large in this arrangement, the supplied cooling air flows through a wide range after cooling the optical element. In this case, the cooling air having a high temperature after cooling the optical element flows toward the other optical elements, and rises the temperatures of the other optical elements in some cases. Thus, the angle formed by the two supply directions (collision angle) needs to be decreased. However, when the collision angle of the two supply directions determined in this arrangement is decreased, the flow range of the cooling air flowing at high speed after collision shifts from the center of the optical element releasing a large amount of heat. In this case, the cooling efficiency lowers.

According to this aspect of the invention, the two supply directions are so determined as to extend from the one edge to the other edge of the two opposed edges of the optical element.

In this arrangement, even when the angle formed by the two supply directions (collision angle) is decreased, the flow range of the cooling air passing at high speed after collision can be easily disposed around the center of the optical element releasing a large amount of heat. Thus, the cooling efficiency increases. Moreover, the cooling air having cooled the optical element can be guided toward a predetermined narrow area. Accordingly, the cooling air having a high temperature after cooling the optical element does not flow toward the other optical elements, causing no temperature increase of the other optical elements.

It is preferable that the angle formed by the two supply directions in the projector of the above aspect is 45 degrees or smaller.

According to this structure, the angle formed by the two supply directions is set as above. In this case, the area where the cooling air having high speed is produced after collision can be expanded toward the downstream side of the cooling air. Thus, the efficiency of heat exchange between the optical element and the cooling air can further increase, which contributes to further effective cooling for the optical element.

It is preferable that the two supply directions in the projector of the above aspects are symmetric with respect to a center line connecting the respective center positions of the two edges.

According to this structure, the two supply directions are set as above. In this case, the cooling air can be supplied along the entire surface of the optical element. Thus, the whole area of the optical element can be cooled with a good balance.

It is preferable that the crossing position of the cooling air supplied in the two supply directions in the projector of the above aspects is disposed on the upstream side of the cooling air with respect to the center position of the surface of the optical element.

According to this structure, the crossing position of the two supply directions is located at the position defined as above. In this case, the cooling air collides with each other on the upstream side of the supplied cooling air with respect to the center position of the surface of the optical element. Thus, the center of the surface of the optical element releasing a large amount of heat can be cooled by the cooling air flowing at high speed after collision, which contributes to further effective cooling for the optical element.

It is preferable that the cooling device of the projector of the above aspects has two ducts configured to guide cooling air introduced from one end of the duct toward the optical element. In this case, the two ducts communicate with each other at the other ends of the ducts, each of the ducts have an outlet port that the cooling air flows out along the two supply directions at the other end of the duct.

In the case of the structure of the duct disclosed in JP-A-2005-338236, the cooling air collides with the wall surface at the other end of the duct. In this arrangement, friction produced on the wall surface lowers the flow speed of the cooling air due to pressure losses. With the drop of the flow speed of the cooling air, the flow amount of the cooling air flowing through the outlet port decreases. In this case, the optical element receives only an insufficient amount of cooling air, and thus is difficult to be cooled in a preferable condition.

According to the structure of this aspect of the invention, the cooling device has the two ducts.

In this structure, the cooling air introduced from one ends of the ducts collides with each other at the other ends, and then changes the flow directions and comes out through the respective outlet ports to flow in the two supply directions.

Since the cooling air changes its flow direction by collision with each other within the ducts, flow speed drop can be more prevented with smaller pressure losses of the cooling air compared with the structure which has the duct allowing cooling air to collide with the wall surface or the like for change of the flow direction as disclosed in JP-A-2005-338236. Thus, the cooling air can be guided from the outlet ports toward the optical element while maintaining constant speed after collision.

In this condition, the flow amount of the cooling air guided toward the optical element does not decrease. Accordingly, the optical element can be further effectively cooled by the sufficient quantity of cooling air supplied to the optical element.

It is preferable that the two ducts of the projector of the above aspects are arranged in a line and communicate with each other.

For example, when the cooling air introduced from the one ends of the two ducts collides with each other in oblique directions, a part of the cooling air flows to the wall surfaces of the ducts and changes its flow direction on the wall surfaces, and then flows out through the corresponding outlet ports toward the optical element. In this case, friction produced on the wall surfaces may cause flow speed drop of the cooling air due to pressure losses.

According to the structure of this aspect of the invention, the respective ducts are arranged in a line and communicate with each other.

In this case, the cooling air introduced from one ends of the two ducts collides with each other in the opposed directions. Thus, a large part of the cooling air can flow without touching the wall surfaces of the ducts at the time of collision. Accordingly, the cooling air flows out from the respective outlet ports toward the optical element without lowering the flow speed after collision, which contributes to further effective cooling for the optical element.

BRIEF DESCRIPTION OF THE DRAWINGS

The invention will be described with reference to the accompanying drawings, wherein like numbers reference like elements.

DESCRIPTION OF EXEMPLARY EMBODIMENT

An embodiment according to the invention is hereinafter described with reference to the drawings.

Structure of Projector

Figure 1:
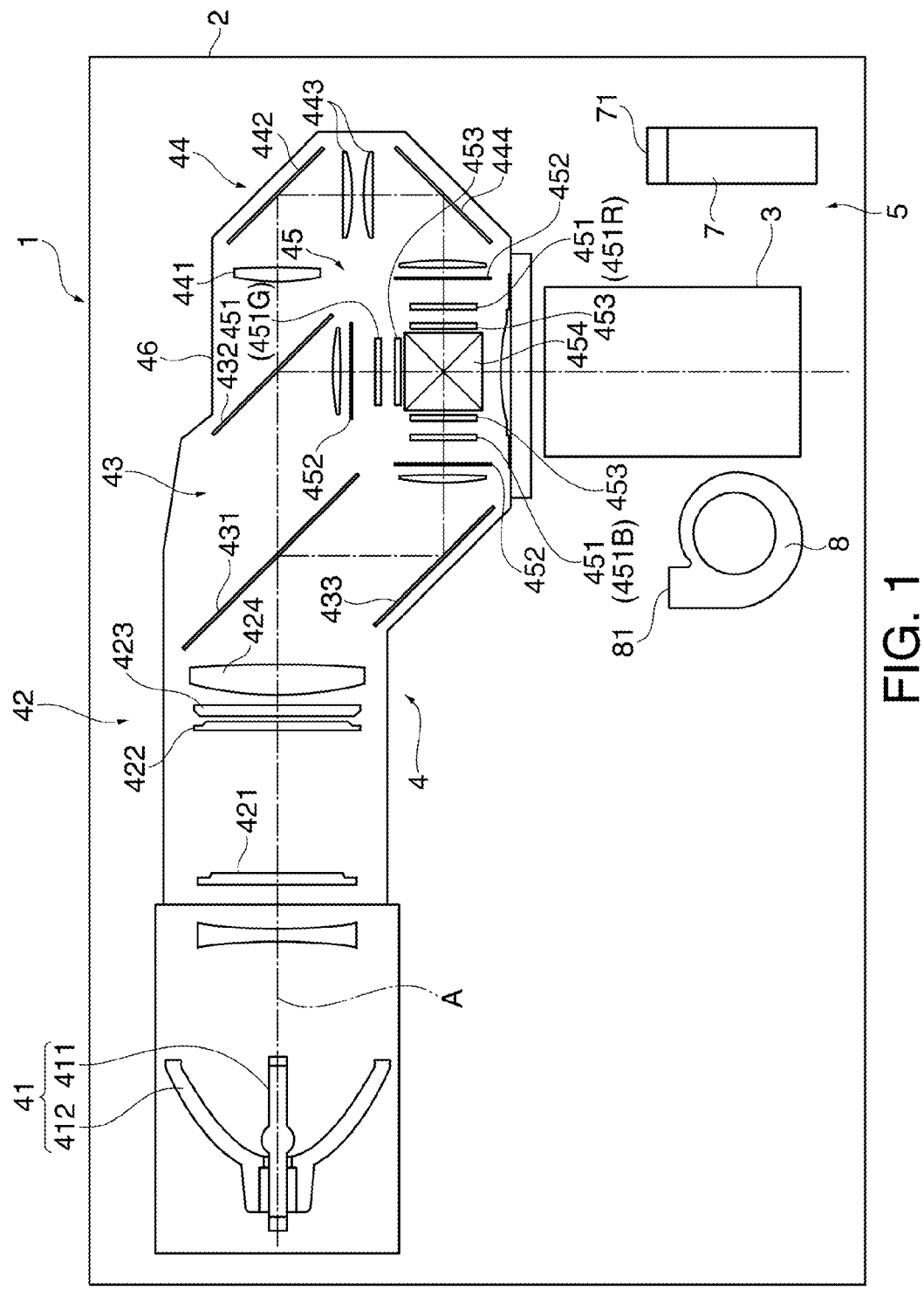
FIG. 1 illustrates the general structure of a projector according to an embodiment of the invention.

FIG. 1 illustrates the general structure of a projector 1 according to this embodiment. More specifically, FIG. 1 schematically illustrates the general structure of the projector 1.

In the following description, the projection side of the projector 1 (the side where a projection lens 3 is disposed) corresponds to the "front side", and the opposite side corresponds to the "rear side". The top side of the projector 1 (the front side with respect to the sheet surface of FIG. 1) corresponds to the "upper side", and the bottom side corresponds to the "lower side". The "left side" and the "right side" in the following description correspond to the left side and the right side of the projector 1, respectively, as viewed from the front.

The projector 1 modulates light according to image information inputted from an external device or the like, and projects the modulated light on a screen (not shown) for display of a projection image. As illustrated in FIG. 1, the projector 1 includes an external housing 2 having a substantially rectangular parallelepiped shape, the projection lens 3, an optical unit 4, and a cooling device 5 for cooling the respective components within the projector 1. The projector 1 further includes a power source unit for supplying power to the respective components within the projector 1, a control device for controlling the respective components within the projector 1, and others, which units and the like are not specifically shown in the figure.

Structure of Optical Unit

The optical unit 4 has a substantially L shape in the plan view which extends from the left to the right along the rear surface of the external housing 2 with the right end in the extending direction bending toward the front.

As illustrated in FIG. 1, the optical unit 4 includes: a light source device 41 having a light source lamp 411 and a reflector 412; an illumination device 42 having lens arrays 421 and 422, a polarization converting element 423, and a stacking lens 424; a color separation device 43 having dichroic mirrors 431 and 432, and a reflection mirror 433; a relay device 44 having an entrance side lens 441, relay lenses 443, and reflection mirrors 442 and 444; an optical device 45 having three liquid crystal panels 451 (red panel 451R as liquid crystal panel for red light, green panel 451G as liquid crystal panel for green light, and blue panel 451B as liquid crystal panel for blue light) corresponding to optical modulation devices (optical elements), three entrance side polarization plates 452, three exit side polarization plates 453, and a cross dichroic prism 454; and an optical component housing 46.

According to the optical unit 4 having this structure, light emitted from the light source device 41 and transmitted through the illumination device 42 is separated into three color lights in R, G, and B by the color separation device 43. The separated color lights are modulated by the corresponding liquid crystal panels 451 according to image information, and combined by the cross dichroic prism 454 into light to be enlarged and projected on the screen (not shown) by the projection lens 3.

The respective optical components 41 through 46 are constituted by optical systems included in various types of projectors generally available, and therefore are not specifically explained herein.

Structure of Cooling Device

Figure 2:
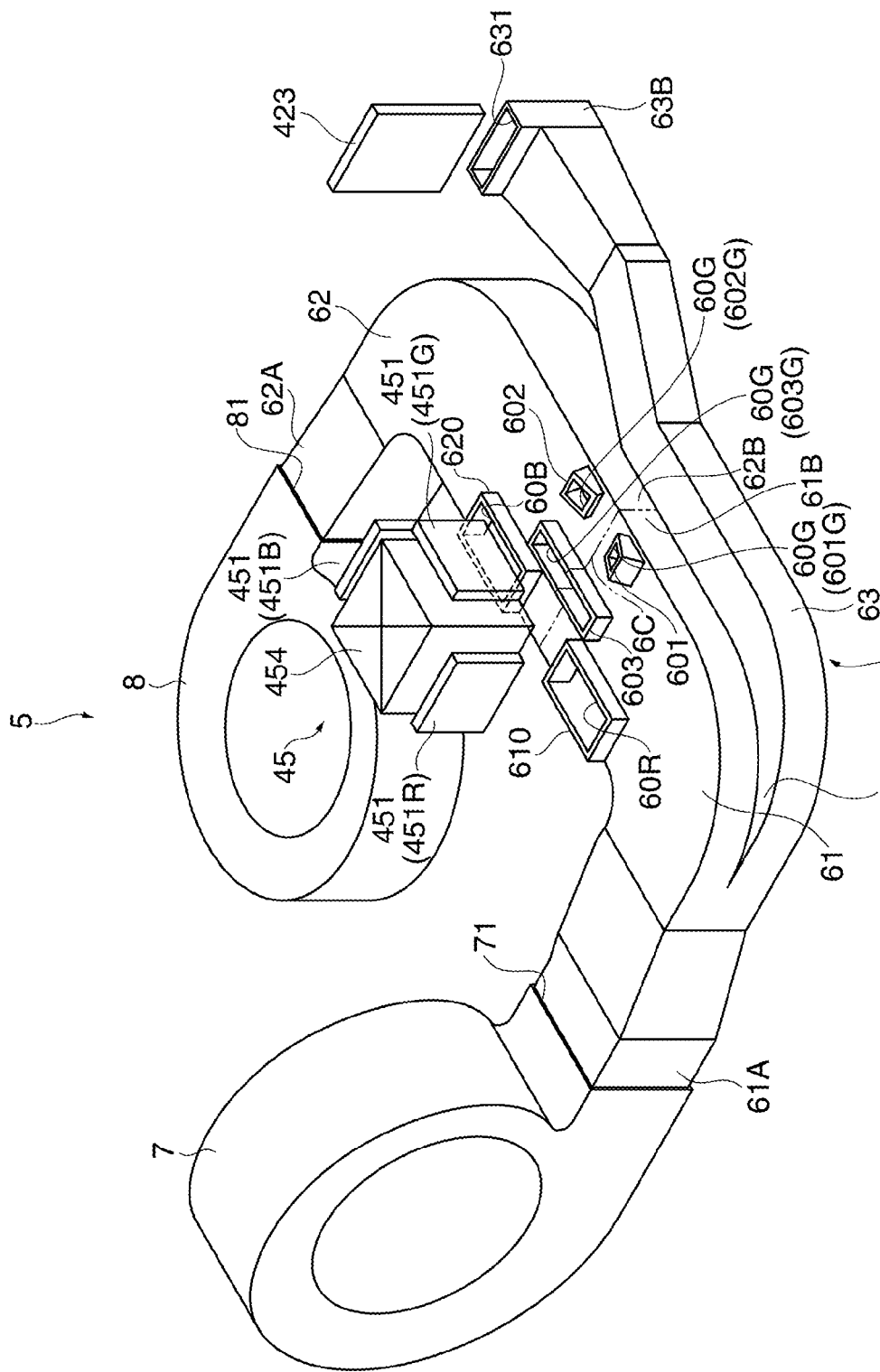
FIG. 2 is a perspective view schematically illustrating a cooling device according to the embodiment.

FIG. 2 is a perspective view showing the main part of this embodiment. More specifically, FIG. 2 is a perspective view of the cooling device 5 and the optical device 45 attached to the cooling device 5 as viewed from the rear side. FIG. 2 does not show the entrance side polarization plates 452 and the exit side polarization plates 453 for easy understanding of the figure. This applies to other figures to be referred to later.

The cooling device 5 is a unit which supplies cooling air to the liquid crystal panels 451, the entrance side polarization plates 452 (see FIG. 1), the exit side polarization plates 453 (see FIG. 1), and others, and includes a duct 6, a first cooling fan 7, and a second cooling fan 8 as illustrated in FIG. 2.

Structure of Cooling Fans

Each of the cooling fans 7 and 8 is constituted by a sirocco fan.

As illustrated in FIGS. 1 and 2, the first cooling fan 7 is disposed on the right side of the projection lens 3 in such a position that an outlet port 71 through which air is discharged faces to the rear side.

As illustrated in FIGS. 1 and 2, the second cooling fan 8 is disposed on the left side of the projection lens 3 in such a position that an outlet port 81 through which air is discharged faces to the rear side.

The respective inlet ports of the cooling fans 7 and 8 through which air is introduced are connected with an air inlet port provided on the external housing 2. That is, the air outside the projector 1 is introduced through the air inlet port into the inlet ports of the cooling fans 7 and 8 by the operation of the cooling fans 7 and 8.

Structure of Duct

As illustrated in FIG. 2, the duct 6 has a first duct portion 61, a second duct portion 62, and a third duct portion 63, as parts formed integrally with each other into one body.

Structure of First Duct

As illustrated in FIG. 2, the first duct portion 61 has an L shape in the plan view which extends from an end 61A as one end of the first duct portion 61 connected with the outlet port 71 of the first cooling fan 7 and elongated toward the rear side, wherefrom the elongated portion is bended toward the left to reach an end 61B as the other end located below the optical device 45.

A red outlet port 60R and green outlet ports 60G are provided at the other end 61B of the first duct portion 61 as illustrated in FIG. 2.

The red outlet port 60R is disposed at the position facing to the red panel 451R, and has a rectangular shape extended in the left-right direction in such a manner as to cross the red panel 451R in the plan view.

A flow rectifying rib 610 having a rectangular frame shape and projecting upward is provided on the periphery of the red outlet port 60R as illustrated in FIG. 2.

The structure of the green outlet ports 60G will be explained in detail later.

Structure of Second Duct Portion

As illustrated in FIG. 2, the second duct portion 62 has an L shape in the plan view which extends from an end 62A as one end of the second duct portion 62 connected with the outlet port 81 of the second cooling fan 8 and elongated toward the rear side, wherefrom the elongated portion is bended toward the right to reach an end 62B as the other end located below the optical device 45.

The duct portions 61 and 62 are connected with each other in such a condition that the other ends 61B and 62B are arranged in a line and communicate with each other.

FIG. 2 shows a connection position 6C between the other ends 61B and 62B by an alternate long and two short dashes line for easy understanding of the figure. This applies to other figures to be referred to later.

As illustrated in FIG. 2, a blue outlet port 60B and green outlet ports 60G are provided at the other end 62B of the second duct portion 62.

The blue outlet port 60B is disposed at the position facing to the blue panel 451B, and has a shape similar to that of the red outlet port 60R.

A flow rectifying rib 620 having a shape similar to that of the rectifying rib 610 of the red outlet port 60R is provided on the periphery of the blue outlet port 60B.

The structure of the green outlet ports 60G will be explained in detail later.

Structure of Third Duct Portion

As illustrated in FIG. 2, the third duct portion 63 connects with the rear side of the first duct portion 61 via an end 63A as one end of the third duct portion 63 such that the one end 63A communicates with the interior of the first duct portion 61, and extends from the one end 63A to the left to reach an end 63B as the other end located below the polarization converting element 423.

As illustrated in FIG. 2, a rectangular PBS outlet port 631 elongated from the front to the rear in the plan view is provided at the other end 63B of the third duct portion 63 in such a position as to face to the polarization converting element 423.

Structure of Green Outlet Ports

As illustrated in FIG. 2, the green outlet ports 60G are provided in the vicinity of the connection position 6C between the duct portions 61 and 62.

The green outlet ports 60G are constituted by a first outlet port 601G, a second outlet port 602G, and an exit side outlet port 603G as illustrated in FIG. 2.

The first outlet port 601G is disposed at the other end 61B of the first duct portion 61 on the light entrance side of the green panel 451G in the plan view as illustrated in FIG. 2.

A flow rectifying rib 601 having a rectangular frame shape whose left side projects diagonally upward is provided on the periphery of the first outlet port 601G as illustrated in FIG. 2.

The second outlet port 602G is disposed at the other end 62B of the second duct portion 62 on the light entrance side of the green panel 451G in the plan view as illustrated in FIG. 2.

A flow rectifying rib 602 having a rectangular frame shape whose right side projects diagonally upward is provided on the periphery of the second outlet port 602G as illustrated in FIG. 2.

The exit side outlet port 603G disposed on the light exit side of the green panel 451G in the plan view has a rectangular shape extending in the left-right direction and crossing the connection position 6C between the duct portions 61 and 62 as illustrated in FIG. 2.

A flow rectifying rib 603 having a rectangular frame shape and projecting upward is provided on the periphery of the exit side outlet port 603G as illustrated in FIG. 2.

Cooling Air Channels

Figure 3:
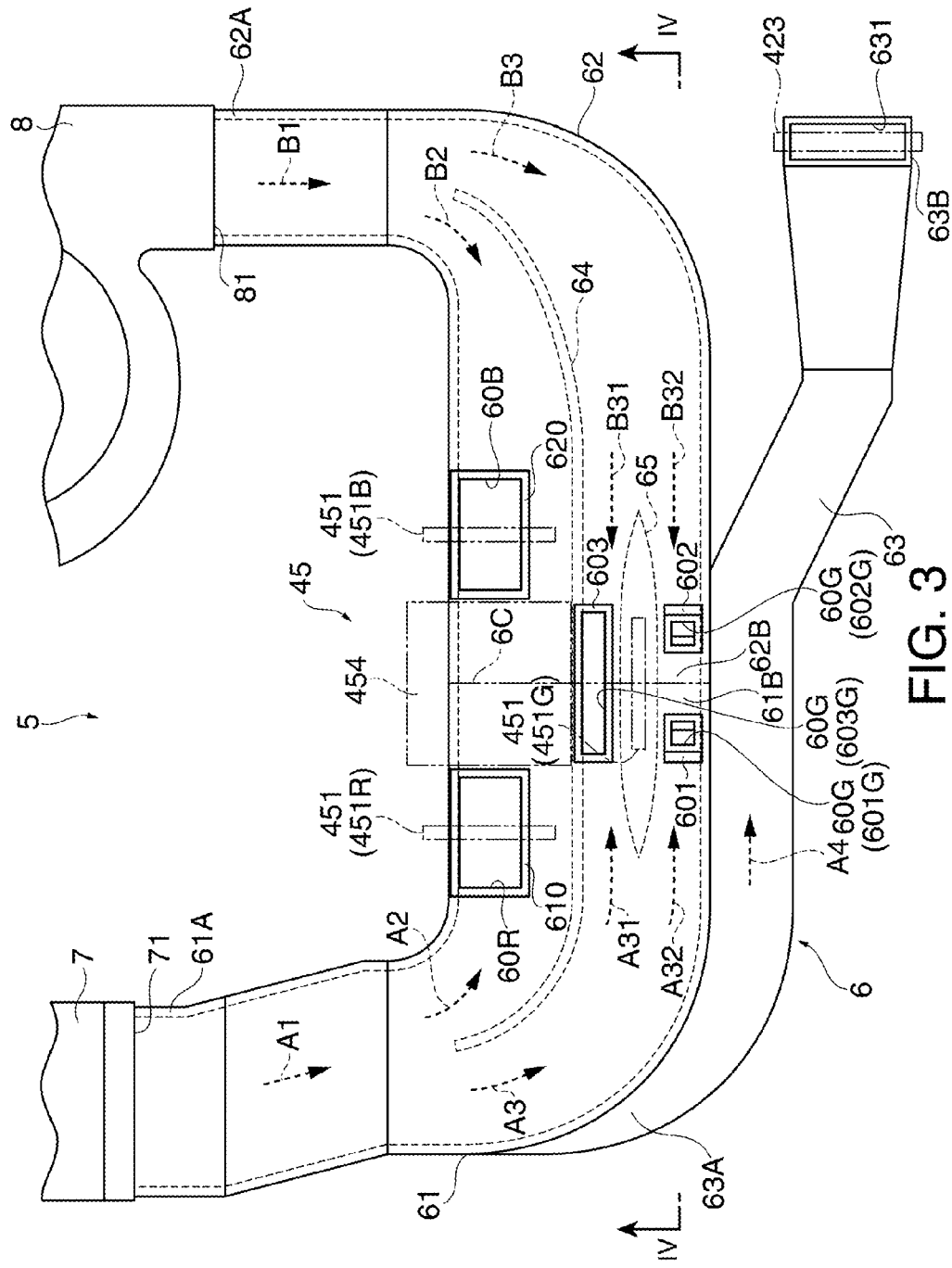
FIG. 3 is a plan view schematically illustrating the cooling device according to the embodiment.
Figure 4:
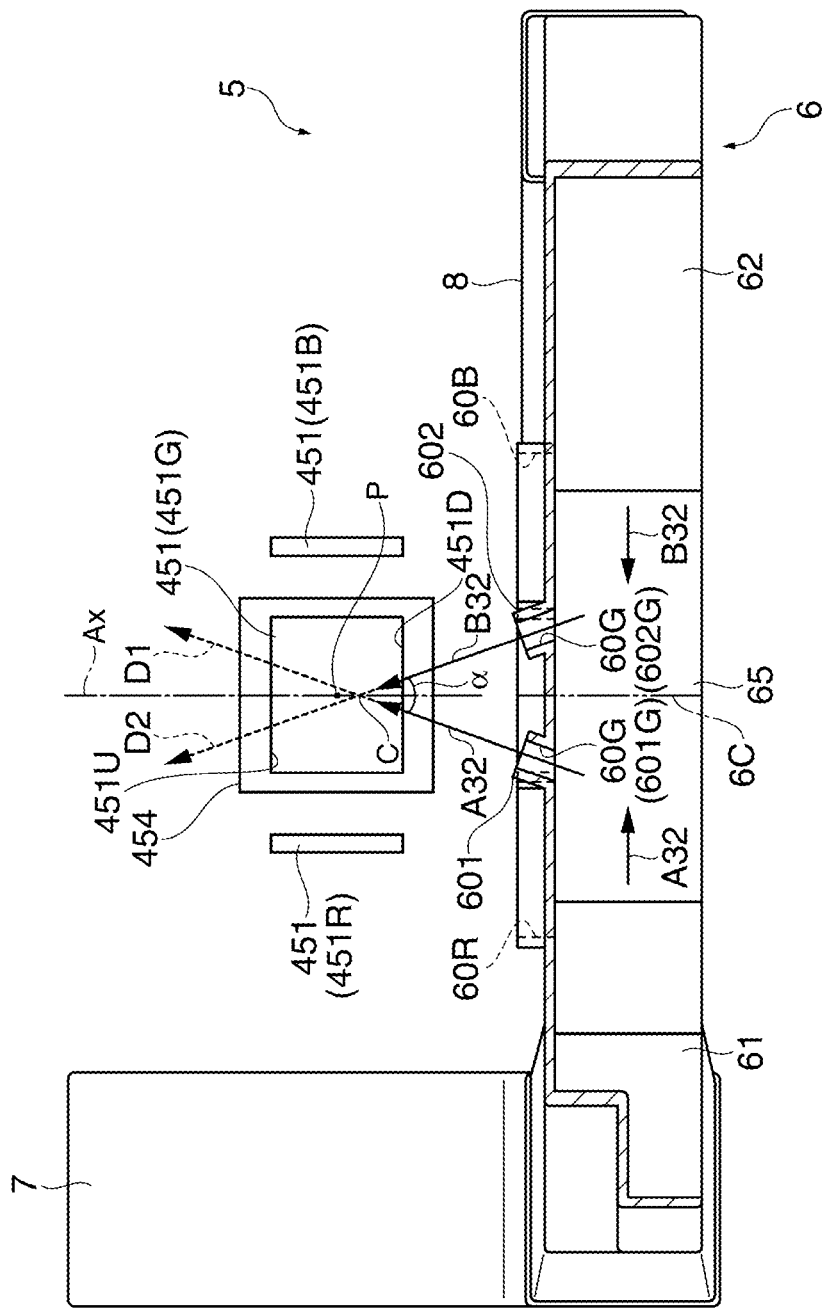
FIG. 4 is a cross-sectional view schematically illustrating the cooling device according to the embodiment.

FIGS. 3 and 4 illustrate cooling air channels along which cooling air flows within the duct 6. More specifically, FIG. 3 is a plan view of the cooling device 5 and the optical device 45 attached to the cooling device 5 as viewed from above. Arrows with broken lines in FIG. 3 show the flow directions of cooling air. FIG. 4 is a cross-sectional view of the duct 6 taken in a line IV-IV in FIG. 3. Arrows with solid lines in FIG. 4 show the flow directions of cooling air.

As illustrated in FIG. 3, cooling airs delivered from the respective cooling fans 7 and 8 are introduced into the duct 6 (cooling airs A1 and B1).

The cooling airs A1 and B1 are divided into cooling airs A2 and B2 and cooling airs A3 and B3 by a first rectifying plate 64 extending in the left-right direction to section the interior of the duct portions 61 and 62 into a part corresponding to the red outlet port 60R and the blue outlet port 60B and a part corresponding to the green outlet ports 60G as illustrated in FIG. 3.

The cooling airs A2 and B2 flow toward the other ends 61B and 62B, respectively, and come out of the duct 6 through the corresponding outlet ports 60R and 60B as illustrated in FIG. 3.

The cooling airs A2 and B2 coming from the outlet ports 60R and 60B are rectified in such directions as to flow upward from below by the rectifying ribs 610 and 620, and supplied to the respective components 451 through 453 for red light and blue light.

As illustrated in FIG. 3, the cooling airs A3 and B3 are divided into cooling airs A31 and B31 and cooling airs A32 and B32 by a second rectifying plate 65 extending in the left-right direction to section the interior of the duct portions 61 and 62 into a part corresponding to the light entrance side of the green panel 451G and a part corresponding to the light exit side of the green panel 451G in the plan view.

A part of the cooling air A3 (cooling air A4) is introduced into the third duct portion 63 as illustrated in FIG. 3. The cooling air A4 flows toward the other end 63B, and comes out of the duct 6 through the PBS outlet port 631. The cooling air A4 coming from the PBS outlet port 631 is rectified in a manner similar to that of the cooling airs A2 and B2 flowing from the outlet ports 60R and 60B, and is supplied to the polarization converting element 423.

As illustrated in FIG. 3, the cooling airs A31 and B31 flow toward the other ends 61B and 62B, and collide with each other in the opposed directions at the connection position 6C, whereat the cooling airs A31 and B31 change their flow directions to the upward directions and flow out of the duct 6 via the exit side outlet port 603G.

Then, the cooling airs A31 and B31 coming from the exit side outlet port 603G are rectified in a manner similar to that of the cooling airs A2 and B2 flowing from the outlet ports 60R and 60B, and supplied to the space between the green panel 451G and the exit side polarization plate 453 for green light.

Similarly, the cooling airs A32 and B32 collide with each other in the opposed directions at the connection position 6C, whereat the cooling airs A32 and B32 change their flow directions to the upward directions and flow out of the duct 6 via the corresponding outlet ports 601G and 602G.

As illustrated in FIG. 4, the cooling airs A32 and B32 coming from the outlet ports 601G and 602G are supplied along the light entrance surface of the green panel 451G.

More specifically, the cooling airs A32 and B32 are rectified by the corresponding rectifying ribs 601 and 602, and supplied in a first supply direction D1 and a second supply direction D2, respectively.

As illustrated in FIG. 4, the respective supply directions D1 and D2 are so determined as to extend from a lower edge 451D toward an upper edge 451U as opposed edges of the four edges defining the green panel 451G as viewed from the light entrance side of the green panel 451G.

In other words, the first supply direction D1 is so established as to cross both the two edges 451D and 451U. The same is true for the second supply direction D2.

Moreover, the respective supply directions D1 and D2 are so determined as to become symmetric with respect to a center line Ax (line connecting the center positions of the edges 451D and 451U) which passes a center position P of the rectangular light entrance surface of the green panel 451G as illustrated in FIG. 4.

Furthermore, the respective supply directions D1 and D2 are so provided as to cross each other as illustrated in FIG. 4.

It is preferable that an angle α formed by the crossing supply directions D1 and D2 is smaller than 45 degrees. In this embodiment, the angle α is set at 40 degrees.

A crossing position C of the supply directions D1 and D2 is determined at a position lower than the center position P (upstream side of the cooling airs to be supplied).

The cooling airs A32 and B32 supplied in the supply directions D1 and D2 collide with each other at the crossing position C, and flow upward therefrom.

The delivery amounts of the cooling fans 7 and 8 are determined such that the cooling airs A3 and B3 can collide with each other at the connection position 6C between the duct portions 61 and 62. More specifically, the delivery amounts of the cooling fans 7 and 8 are determined such that the flow amount of the cooling airs A3 and B3 guided toward the green outlet ports 60G become substantially equivalent.

According to this embodiment, the delivery amount of the cooling air A1 from the first cooling fan 7 is set larger than the delivery amount of the cooling air B1 from the second cooling fan 8. This is because a part of the cooling air A1 delivered from the first cooling fan 7 is introduced into the third duct portion 63.

According to this embodiment, the following advantages can be offered.

In this embodiment, the projector 1 has the cooling device 5 which supplies the cooling airs A32 and B32 in the supply directions D1 and D2 crossing each other.

According to this structure, the cooling airs A32 and B32 supplied in the corresponding supply directions D1 and D2 collide with each other and thereby produce turbulence. In this case, the efficiency of heat exchange between the green panel 451G and the cooling airs A32 and B32 increases, which contributes to effective cooling for the green panel 451G.

The respective supply directions D1 and D2 are so determined as to extend from the edge 451D toward the edge 451U of the green panel 451G. In this case, even when the cooling airs A32 and B32 having cooled the green panel 451G are directed to come into a narrow predetermined area by decreasing the angle α formed by the supply directions D1 and D2 (collision angle) such that the cooling airs A32 and B32 having high temperatures after cooling the green panel 451G are prevented from flowing toward the other optical elements, the flow range of the cooling airs A32 and B32 passing at high speed after collision can be easily disposed around the center of the green panel 451G releasing a large amount of heat. Thus, the cooling efficiency increases.

According to this embodiment, the angle α is set at 40 degrees. The flow speeds of the cooling airs A32 and B32 become high due to the turbulence produced by the collision between the cooling airs A32 and B32. When the angle α is set at a small angle such as 45 degrees or smaller, the flow area of the cooling airs A32 and B32 having high speed after collision can be expanded toward the downstream side of the cooling airs A32 and B32. In this case, the efficiency of heat exchange between the light entrance surface of the green panel 451G and the cooling airs A32 and B32 further rises, which contributes to further effective cooling for the green panel 451G.

The supply directions D1 and D2 are symmetrically disposed with respect to the center line Ax. Thus, the cooling airs A32 and B32 can be supplied to the entire area of the light entrance surface of the green panel 451G, whereby the light entrance surface of the green panel 451G can be cooled with a good balance.

The crossing position C is located on the upstream side of the cooling airs A32 and B32 with respect to the center position P. In this case, the cooling airs A32 and B32 collide with each other on the upstream side of the supplied cooling air with respect to the center position P of the light entrance surface of the green panel 451G releasing a large amount of heat. Thus, not only the center position P of the light entrance surface of the green panel 451G but also a wide area of the light entrance surface of the green panel 451G can be cooled by the cooling airs A32 and B32 having high flow speed after collision. Accordingly, the green panel 451G can be further effectively cooled.

The cooling device 5 has the duct portions 61 and 62 communicating with each other via the other ends 61B and 62B.

In this case, the cooling airs A32 and B32 introduced into the duct portions 61 and 62 through the one ends 61A and 62A collide with each other at the other ends 61B and 62B, whereat the cooling airs A32 and B32 change their flow directions and flow out in the second flow directions through the outlet ports 601G and 602G.

Since the cooling airs A32 and B32 change their flow directions by collision with each other within the duct portions 61 and 62, flow speed drop can be more prevented with smaller pressure losses of the cooling airs compared with a structure which has a duct allowing cooling air to collide with a wall surface or the like for change of the flow direction. Thus, the cooling airs A32 and B32 can be guided from the outlet ports 601G and 602G toward the green panel 451G while maintaining constant speed after collision.

In this case, the flow amounts of the cooling airs A32 and B32 guided toward the green panel 451G do not decrease. Thus, the green panel 451G can be further effectively cooled by the sufficient quantity of cooling air supplied to the green panel 451G.

The duct portions 61 and 62 are arranged in a line and communicate with each other.

According to this arrangement, the cooling airs A32 and B32 introduced from the one ends 61A and 62A of the duct portions 61 and 62 collide with each other in the opposed directions. In this case, large parts of the cooling airs A32 and B32 can flow without touching the wall surfaces of the duct portions 61 and 62 at the time of collision. Thus, the cooling airs A32 and B32 can flow out through the outlet ports 601G and 602G toward the green panel 451G without lowering their flow speeds after collision, which contributes to further effective cooling for the green panel 451G.

Modifications of Embodiment

The invention is not limited to the embodiment described herein but may be practiced otherwise without departing from the scope of the invention. For example, the following modifications, improvements and the like may be made.

According to this embodiment, the cooling airs A32 and B32 are supplied to the green panel 451G in the direction from the lower edge 451D to the upper edge 451U. However, this direction may be the opposite direction. That is, the cooling airs A32 and B32 may be supplied to the green panel 451G in the direction from the upper edge 451U to the lower edge 451D. Alternatively, the cooling airs A32 and B32 may be supplied in the left-right direction instead of the up-down direction.

According to this embodiment, the cooling airs A31 and B31 and the cooling airs A32 and B32 collide with each other in the opposed directions. However, these cooling airs may collide with each other in directions other than the opposed directions.

According to this embodiment, the cooling airs A32 and B32 are guided toward the green panel 451G via the duct portions 61 and 62. However, the cooling airs A32 and B32 may be directly supplied to the green panel 451G from the cooling fans 7 and 8 without using the duct portions 61 and 62.

According to this embodiment, the light entrance surface of the green panel 451G is cooled. However, the light exit surface, or both the light entrance surface and the light exit surface of the green panel 451G may be cooled.

According to this embodiment, the green panel 451G is the cooling target optical element. However, the cooling target may be the red panel 451R, the blue panel 451B, the entrance side polarization plates 452, the exit side polarization plates 453, or others.

According to this embodiment, the transmission type liquid crystal panels 451 are used. However, reflection type liquid crystal panels may be employed in lieu of the transmission type.

According to this embodiment, the projector 1 including the liquid crystal panels 451 as the optical elements has been discussed. However, the projector 1 may have other types of optical elements having other structures as long as they are optical elements capable of modulating entering light. For example, the invention is applicable to a projector which includes optical elements other than of the liquid crystal type such as a device using micromirrors.

According to this embodiment, the front-type projector 1 whose image projecting direction of image light onto the projection surface is substantially equivalent to the image viewing direction of the image light has been discussed. However, the invention is applicable to a rear-type projector whose image projecting direction and image viewing direction are opposite to each other.

Accordingly, the technology of the invention has applicability to a wide variety of projectors used for presentation, home theater or for other purposes.

What is claimed is:
1. A projector comprising:
an optical element; and
a cooling device configured to supply cooling air along the surface of the optical element, wherein
the cooling device supplies the cooling air in two supply directions crossing each other and extending from a first edge to a second edge of two opposed edges of the optical element,
the cooling air in the two supply directions passes across the first edge, and not across an edge intersecting with the first edge, and collides at a surface of the optical element, and
the angle formed by the two supply directions is 45 degrees or smaller.
2. The projector according to claim 1, wherein
the two supply directions are symmetric with respect to a center line connecting the respective center positions of the two opposed edges.

3. The projector according to claim 1, wherein
the cooling device has two ducts configured to guide cooling air introduced from one end of the duct toward the optical element; and
the two ducts communicate with each other at the other end of the ducts, each of the ducts have an outlet port that the cooling air flows out along the two supply directions at the other end of the ducts.

4. The projector according to claim 3, wherein the two ducts are arranged in a line and communicate with each other.

5. The projector according to claim 1, wherein
the cooling air is supplied along a light entrance side surface of the optical element, and
the cooling air in the two supply directions cools the light entrance side surface of the optical element.

6. The projector according to claim 1, wherein the cooling device is configured to supply cooling air along a light entrance side surface and along a light exit side surface of the optical element,
the cooling device supplies the cooling air over the light entrance side surface in two supply directions crossing each other and extending from the first edge to the second edge of two opposed edges of the optical element, and
the cooling device supplies the cooling air over the light exit side surface in a third direction extending from the first edge to the second edge of the two opposed edges of the optical element, the third direction being different from each of the two supply directions.

7. The projector according to claim 1, wherein
a crossing position of the cooling air supplied in the two supply directions is disposed on an upstream side of the cooling air with respect to the center position of the surface of the optical element.

8. The projector according to claim 1, wherein
the cooling air in the two supply directions collides at a light entrance side of the optical element.

* * * * *